Sept. 21, 1954 H. WALDSCHMIDT 2,689,709

ELECTRICIAN'S FISH TAPE REEL

Filed Oct. 1, 1953

INVENTOR.

Henry Waldschmidt

BY Lynn H. Latta

ATTORNEY

Patented Sept. 21, 1954

2,689,709

UNITED STATES PATENT OFFICE 2,689,709

ELECTRICIAN'S FISH TAPE REEL

Henry Waldschmidt, Culver City, Calif.

Application October 1, 1953, Serial No. 383,461

8 Claims. (Cl. 254—134.3)

This invention relates to reels for electrician's fish tape (a tape used in "fishing" electric conductors through metal conduit in the wiring of buildings etc.). Its general object is to improve upon and facilitate the operation of the conventional fish tape reel.

The conventional reel comprises simply a drum of toroidal (ring-shaped) general contour, with a deep channel cross section including a bottom web, conventionally of cylindrical form, upon which the narrow flat metal tape is wound, together with axially spaced side wall members projecting generally radially outwardly from said web and terminating in peripheral lips which define between them a circumferential slot, of substantially the same width as the tape, through which the tape emerges. Customarily, the width of the slot is the same or slightly less than the width of the tape, so that the tape is imprisoned inside the reel except when forcibly pulled out of or into the reel. In either case, the electrician grasps the reel in one hand and the tape in the other hand, and manipulates the portion of the tape which extends tangentially from the body of tape wound upon the reel bottom, through the peripheral slot of the reel, and subjects this tangential portion to tension by a pull which is directed either radially outwardly or radially inwardly in order to remove a length of the tape from the reel or to reinsert a length of the tape back into the reel, respectively. The tape is customarily of rectangular section, of sufficient thickness (e. g. ⅛" x .045", ⅛" x .060", ¼" x .060") to resist buckling and twisting when in use, and has corner edges which tend to chafe and abrade the hands of the electrician during the above referred to pulling process. To force the tape into and out of the reel calls for the expenditure of muscular energy, and this, coupled with the abrading effect on the hands, makes the use of the tape a wearing task for the operator.

A primary object of the present invention is to provide an improved fish tape reel which includes mechanism for directly spreading the lips of the reel drum where the tape passes between the lips, so that the operator need no longer utilize the wedging contact between the side margins of the tape and the reel lips, in order to effect such spreading.

A further object is to provide an improved fish tape reel which eliminates the necessity for the operator grasping the tape directly in his hand and applying tension thereto in order to remove it from the reel or reinsert it into the reel.

More specifically, the invention contemplates an improved fish tape reel embodying means for mechanically engaging and spreading the lips of the reel drum while simultaneously guiding the tape through the widened portion of the reel drum slot which is thereby provided.

In this connection it may be noted that as the tape is unreeled, the widened area of the slot must travel circumferentially around the reel drum, and accordingly the invention further aims to provide a mechanism including a spreading device which is so associated with the reel drum as to be freely movable circumferentially thereon while exerting a wedging action between the lips of the reel drum so as to spread the slot and allow the tape to freely emerge.

A further object is to provide such an arrangement wherein the amount of effort required for spreading the lips is reduced to a minimum through the use of a spreading device having a rolling action which substantially eliminates friction in the spreading operation.

A further object is to provide such an improved fish tape reel, wherein the spreading device is carried by a handle which encloses a segment of the reel drum and has an anti-friction rolling connection therewith such that the handle may be freely moved around the circumference of the reel while the spreading action is being exerted. Further, the invention contemplates such an arrangement wherein the spreading device is so associated with the handle that the hand of the operator may simultaneously grasp the handle and the spreading device and exert pressure against the spreading device in either of two directions so as to spread the reel drum slot either ahead of or behind the tape depending upon whether the tape is being removed from or reinserted into the reel.

Another object is to provide such a fish tape reel, embodying a handle which is of a sectional structure embodying separable sections latched together so as to make it possible to quickly remove the handle from the reel drum or to replace the handle on the reel drum as desired. In this connection, it is a further object to provide a combined handle and spreading device in the form of an attachment which may be quickly attached to any conventional fish tape reel drum as an accessory.

Other objects will become apparent in the ensuing specifications and appended drawings in which.

Figures 1, 2, 3, 4, 5:
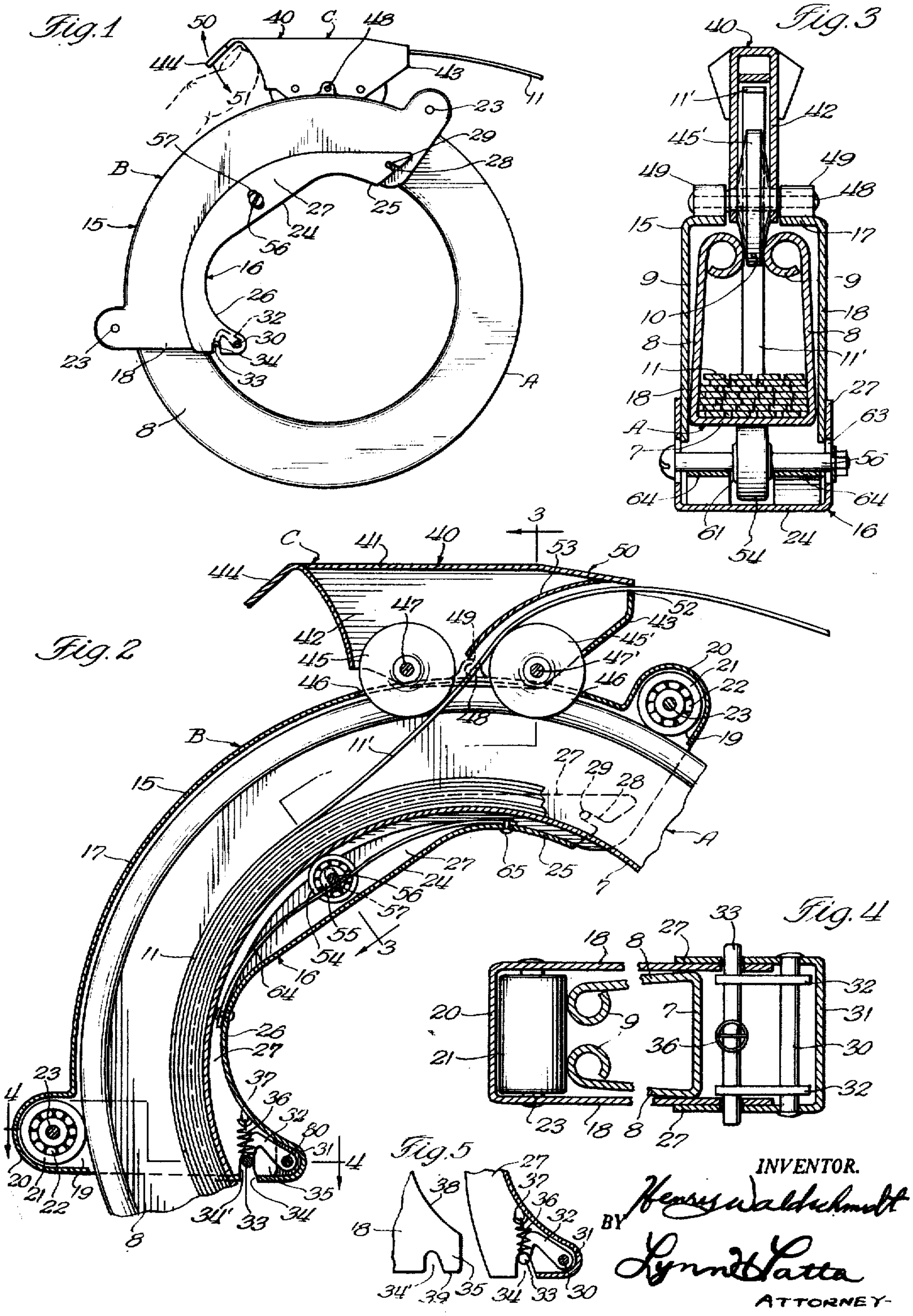
Fig. 1 is a side view of the reel drum embodying my invention.
Fig. 2 is a sectional view, taken in the median radial plane of the reel, in the area thereof surrounded by the handle and spreader attachment, with the latter shown in longitudinal section.
Fig. 3 is a transverse sectional view taken on the line 3—3 of Fig. 2.
Fig. 4 is a transverse sectional view taken on the line 4—4 of Fig. 2.
Fig. 5 is an exploded view partially in section, of the releasable latching means.

Referring now to the drawings in detail, the conventional fish tape reel drum is indicated generally at A. It comprises a cylindrical bottom web member 7 and a pair of side flange members 8 which extend in a generally radially outward direction and terminate in peripheral lips 9 which are axially spaced to define slot 10. The tape 11, of narrow, relatively thick, rectangular cross section, is wound upon the bottom web 7 and has a portion thereof, indicated at 11′, which extends tangentially from the reeled body of tape, through slot 10, where it may be grasped and utilized by the electrician. The lips 9 are customarily in the form of rolled beads of generally circular cross section, providing relatively smooth double curved surfaces, which, in the conventional reel, are engaged by the edges of the tape as it is pulled into or out of the reel, the tape itself exerting a wedging action against these curved surfaces.

The present invention provides, in combination with the reel drum A; a handle unit B of sleeve form encircling a segment of reel drum A and of arcuate longitudinal contour corresponding to that of the reel drum A; and an actuator unit, referred to generally by the reference letter C.

Handle unit B is of sectional construction, comprising an outer member 15 and an inner member 16 which is separably latched to outer member 15. Outer member 15 is generally of channel section, including a peripheral web portion 17 (Figs. 2 and 3) and a pair of side wall members 18 which are in fairly close embracing though freely slidable relation to side flanges 8 of the reel drum A. At the respective ends of the handle unit B, side wall members 18 are extended radially outwardly to provide axially spaced ears 19, and peripheral web 17 is arched outwardly at 20 and joined to ears 19 to provide roller housing sockets in which are received rollers 21. Rollers 21 constitute the outer races of anti-friction bearings 22 which are journalled on pintles 23 the ends of which are mounted in ears 19. Rollers 21 are arranged to bear against the respective peripheral beads 9 of the reel drum A so as to provide for rolling support of handle 17 on drum A with the inner wall of web member 17 out of contact with the periphery of the drum.

Inner handle member 16 is likewise of channel section, including a web having a chordal central portion 24 and arched end portions 25 and 26; member 16 further including side flanges 27 having at one end slots 28 to receive pins 29 that are anchored in side wall members 18 of the outer handle portion 15. At the other end of handle member 16, there is a spring urged latch comprising a pintle 30 which extends through a pocket 31 at the end of web portion 26, and is journalled in the side flanges 28 of handle member 16, a pair of spaced elbow-shaped arms 32 mounted on pintle 30 (Fig. 4) and projecting generally radially outwardly, and a pin 33 carried by the free ends of arms 32 and having limited swinging movement in slots 34 (Fig. 5) in side flanges 28. The ends of pin 33 are adapted to engage in slots 34′ in radially inwardly projecting end parts 35 of side wall members 18 of handle member 15 at the latching end thereof, the slots 34′ extending generally circumferentially. A coil spring 36, under tension between pin 33 and a hook 37 struck inwardly from web member 26 adjacent socket 31, urges the pin 33 in a direction to bottom in slots 34 and 34′. End parts 35 are shaped to fit snugly in pockets 31, having curved inner edges 38 which are fitted to the inner wall of arched web portion 26 of handle member 15, and squared end edges 39 which abut the terminal wall portion of socket 31. Thus the end parts 35 are adapted to establish a loose wedging fit in socket 31, such that socket 31 can be separated from parts 35 only by moving in a generally radially inward direction, as indicated by the arrow in Fig. 5. Such separation is prevented by the interengagement of the respective end portions latch pin 33 in notches 34 and 34′ of the socket 31 and end parts 35 respectively.

To release the latching connection between handle members 15 and 16, the operator engages the ends of latch pin 33 between the fingers and swinging the pin out of notches 34, 34′ until it clears the end edges 39 of end parts 35. Pivoting the inner handle member 16 at its one end on pins 29, the other end thereof is swung radially inwardly to provide sufficient clearance between web member 26 of handle member 16 and handle member 16 carries a roller 54 which forms the outer race of an anti-friction bearing 55 journalled upon a pintle 56 the ends of which are mounted in slots 57 in the respective side flanges 28.

Spreader unit C comprises a lever 40, which may be of stamped sheet metal construction, including a web portion 41, side wall members 42, a forward nose portion 43, and a tail member 44, functioning as a finger-thumb grip. Side wall members 42 are spaced apart just enough to embrace a pair of discus shaped spreading rollers 45, 45′ having frusto-conical side faces, whereby they taper to minimum width at their peripheries and are engageable in the slot 10. Side wall members 42 are received in a slot 46 in peripheral web 17 of the handle member 15. Rollers 45, 45′ are pivoted on the ends of pins 47, 47′ which are mounted in side walls 42.

Lever 40 is pivoted, intermediate its ends, upon a pivot 48, between a pair of ears 49 which are struck outwardly from web member 17 at the respective sides of slots 46. Thus the lever may be rocked so that either the forward or the rearward end thereof may be moved radially inwardly with reference to the handle unit B, thus to force roller 45 or 45′ between lips 9, spreading the lips.

Tape 11 has a portion 11′ thereof projecting between rollers 45, 45′ and through an aperture 52 in the end of the lever 40. A guide member 53 inside of lever 40 guides the tape from the point between the rollers to the aperture 52.

It will now be apparent that the handle B may be slid circumferentially along reel drum A with rollers 45, 45′ riding against lips 9 and rotating to provide a substantially frictionless connection between them. By tilting lever 40 as indicated by arrow 50, roller 45′ may be forced radially inwardly, exerting a wedging action to spread lips 9 behind the tape 11′. By tilting lever 40 as indicated by arrow 51, roller 45 may be forced radially inwardly, to spread the lips 9 ahead of the tape 11′.

A pair of leaf springs 58 are secured at their respective ends, as by rivets 59, to handle member 16, with their central portions bearing against pintle 56 on respective sides of roller 54. Roller 54 is thus embraced between the leaf springs 58 (Fig. 3).

In the operation of the device, the operator grasps the handle B and spreader unit C in one hand, with the fingers extending inwardly and hooked around handle member 16 and with the thumb hooked under grip 44 (or with grip 44 grasped between the thumb and forefinger). He then grasps the reel member A in the other hand and by a suitable pull, causes the reel member A to rotate inside of handle unit B. During such rotation, he bears upwardly against the leftward end of lever 40 as viewed in Fig. 2, in order to spread the lips 9 rearwardly of tape section 11′ when rolling the tape upon the reel (in which case the reel is rotated counterclockwise). If he is removing tape from the reel, he rotates the reel member A clockwise and bears downwardly aganist the grip 44 of the lever 40 to spread the lips 9 ahead of the tape 11′. Thus the tape may be removed from or reeled onto the reel drum without frictional engagement between the side margins of the tape and the lips 9, the spreading of the lips being accomplished by the wedging pressure of rollers 45, 45′ as they roll against lips 9 with a substantially anti-friction rolling contact.

When the lever 40 is in a neutral position, the lips 9 will grip the edges of tape section 11′, so as to clamp the tape securely against unreeling.

I claim:

1. In a fish tape reel, a toroidal reel drum of channel section including a web on which the tape may be wound and a pair of flanges projecting radially outwardly therefrom and having peripheral lips which are axially opposed to define a circumferential slot through which the tape is adapted to pass with an interference fit; a handle of arcuate sleeve form, enclosing a segment of said drum and circumferentially slidable thereon; an actuator lever pivoted to said handle on an axis parallel to the drum axis; and a roller of discus form rotatably mounted in said lever in the plane of said slot and projecting into said slot, said roller having frusto-conical side walls engageable with said lips with a wedging action for spreading the lips adjacent the point of emergence of the tape through said slot when said lever is tilted to move said roller radially inwardly.

2. In a fish tape reel, a toroidal reel drum of channel section including a web on which the tape may be wound and a pair of flanges projecting radially outwardly therefrom and having peripheral lips which are axially opposed to define a circumferential slot through which the tape is adapted to pass with an interference fit; a handle of arcuate sleeve form, enclosing a segment of said drum and circumferentially slidable thereon, said handle having a peripheral aperture; an actuator lever pivoted to said handle on an axis adjacent said aperture and parallel to the drum axis; and a roller of discus form rotatably mounted in said lever in the plane of said slot and projecting through said aperture and into said slot, said roller having frusto-conical side walls engageable with said lips with a wedging action for spreading the lips adjacent the point of emergence of the tape through said slot when said lever is tilted to move said roller radially inwardly.

3. In a fish tape reel, a toroidal reel drum of channel section including a web on which the tape may be wound, and a pair of flanges projecting radially outwardly therefrom and having peripheral lips which are axially opposed to define a circumferential slot through which the tape is adapted to pass with an interference fit; a handle of arcuate sleeve form, enclosing a segment of said drum and circumferentially slidable thereon; an actuator lever pivoted to said handle intermediate its ends on an axis parallel to the drum axis, for rocking movement in the plane of said slot; and a pair of rollers of discus form rotatably mounted in said lever in said slot plane and projecting into said slot, said rollers having frusto-conical side walls engageable with said lips with a wedging action to spread the lips ahead of the point of emergence of the tape through said slot when the lever is tilted in one direction and behind said point of emergence when the lever is tilted in the opposite direction.

4. A fish tape reel as defined in claim 3, wherein said lever has a passage extending from between said rollers through an end of said lever at a point radially outwardly of the rollers, through which said tape passes in emerging from the drum.

5. A reel as defined in claim 1, wherein said handle is provided, at its respective ends, with anti-friction rollers travelling on the periphery of said drum.

6. A reel as defined in claim 1, wherein said handle is provided, at its respective ends, with anti-friction rollers travelling on the periphery of said drum and is provided, intermediate its ends, with a spring-pressed roller travelling against the inner wall of the drum.

7. A reel as defined in claim 1, wherein said handle comprises an outer member of channel section having side portions embracing the respective sides of the drum and projecting radially inwardly of the inner margin of the drum, and an inner member having at its respective ends, means separably attaching the same to said inwardly projecting side portions of the outer member.

8. A reel as defined in claim 1, wherein said handle comprises an outer member of channel section having side portions embracing the respective sides of the drum and projecting radially inwardly of the inner margin of the drum, and an inner member having at its respective ends, means separably attaching the same to said inwardly projecting side portions of the outer member, said attaching means comprising a circumferentially extending slot in one end of said inner handle member, a pin mounted in the corresponding end of the outer handle member and receivable in said slot, a generally radially inwardly extending end part on the other end of said outer handle member, a socket on the corresponding end of the inner handle member and snugly fitting circumferentially opposed surfaces of said end part, said socket and end part having registering circumferentially extending notches, and a latch element carried by said socket and engageable in said notches to latch said socket to said end part against relative radial movement.

References Cited in the file of this patent

UNITED STATES PATENTS

| Number | Name | Date |
|---|---|---|
| 1,811,945 | Lange | June 30, 1931 |
| 1,815,433 | Dunagan | July 21, 1931 |
| 1,890,945 | Hormel | Dec. 13, 1932 |
| 2,534,472 | Norvelle | Dec. 19, 1950 |